(12) United States Patent
Kim et al.

(10) Patent No.: US 6,456,689 B2
(45) Date of Patent: Sep. 24, 2002

(54) METHOD OF DRIVING X-RAY IMAGING DEVICE

(75) Inventors: Chang Yeon Kim, Seoul; Beom Jin Moon, Anyang-shi, both of (KR)

(73) Assignee: L. G. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/748,866

(22) Filed: Dec. 28, 2000

(30) Foreign Application Priority Data

Dec. 31, 1999 (KR) .............................. 99-68051

(51) Int. Cl.[7] ................................. H05G 1/32
(52) U.S. Cl. ................. 378/98.8; 378/91; 378/207; 250/370.09
(58) Field of Search .................. 378/91, 98.8, 207; 250/370.09, 370.11, 580, 208.1; 348/241, 243

(56) References Cited

U.S. PATENT DOCUMENTS 5,818,898 A * 10/1998 Tsukamoto et al. ........ 378/98.8
6,127,684 A * 10/2000 Kaifu .................... 250/370.09

* cited by examiner

*Primary Examiner*—David P. Porta
*Assistant Examiner*—Therese Barber
(74) *Attorney, Agent, or Firm*—McKenna Long & Aldridge (57) ABSTRACT

Driving an X-ray imaging device by applying a high voltage signal to a photo-sensing layer, reading the stored charges that result from dark charges produced by the high voltage signal using a data reader such that stored charges are removed from the charging capacitors, performing X-ray irradiation such that X-ray induced charges are stored in a charging capacitor, and converting the stored charges to electrical signals, all while maintaining the high voltage on the photo-sensing layer. The driving method improves a contrast ratio caused by the dark charges and reduces signal variations caused by turning-off the high voltage before converting the stored charge into electrical signals. As the high voltage turned on and off only one once the driving time can be reduced.

14 Claims, 7 Drawing Sheets

METHOD OF DRIVING X-RAY IMAGING DEVICE

This application claims the benefit of Korean Patent Application No. 1999-68051, filed on Dec. 31, 1999, which is hereby incorporated by reference for all purposes as if fully set forth herein.

BACKGROUND OF THE INVENTION

1. Field of the Invention

The present invention relates to a method of driving an X-ray imaging device, and more particularly to a method of driving an X-ray imaging device that is capable of improving a picture's contrast ratio and of shortening a driving time.

2. Discussion of the Related Art

Imaging systems that employ X-rays have been used in numerous medical, scientific and industrial applications. Such imaging systems include X-ray imaging devices. One type of X-ray imaging device uses an array of photosensitive cells on an array panel to sense the intensity of X-rays passing through an object. Those X-ray intensities are used to produce an image of the object. In operation, the photosensitive cells generate electric charges in proportion to the intensity of the X-rays. The electric charges from the photosensitive cells are applied to a signal converter that converts the charges into electrical signals, which are in turn sent to an image output device. The image output device processes the electrical signals so as to display the X-ray intensity pattern on a screen.

Figure 1A:
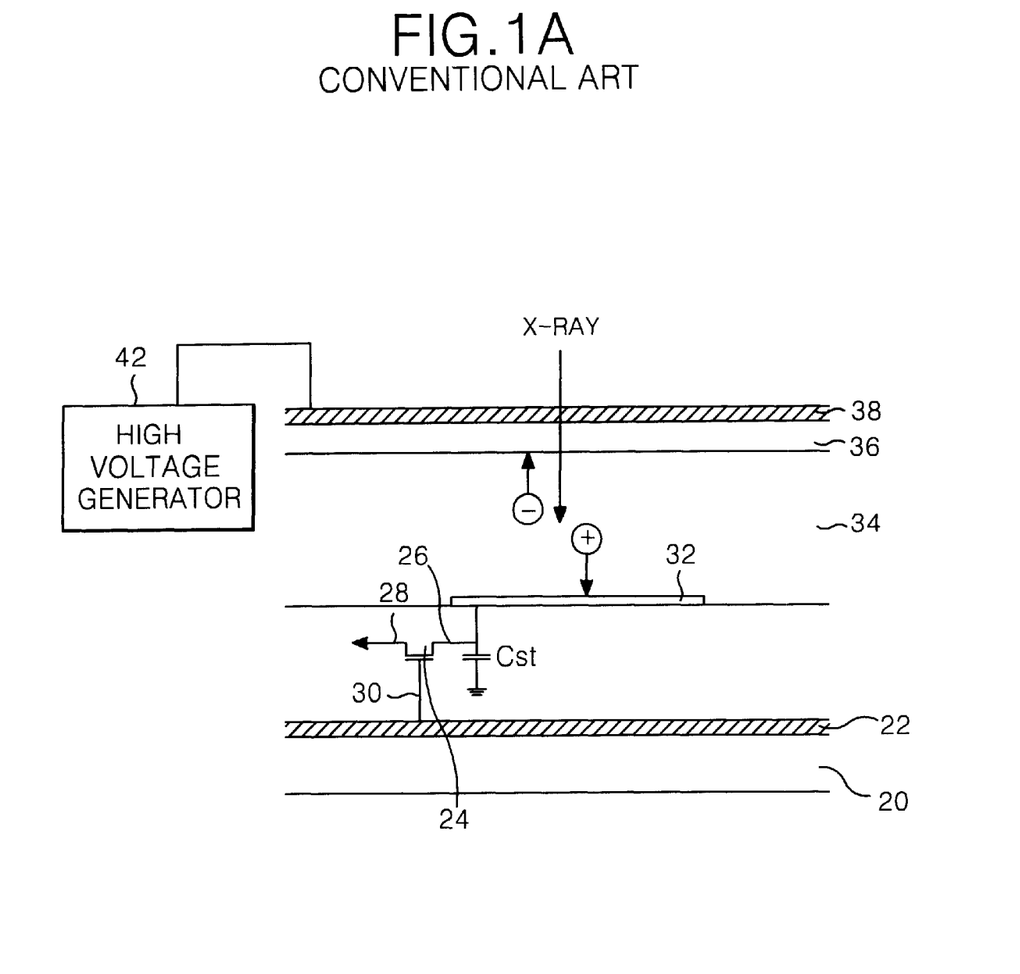
FIGS. 1A and 1B respectively present a sectional schematic view and a planar schematic view of a photo-sensitive cell in a photo sensitive cell array panel of a conventional X-ray imaging device.
Figure 1B:
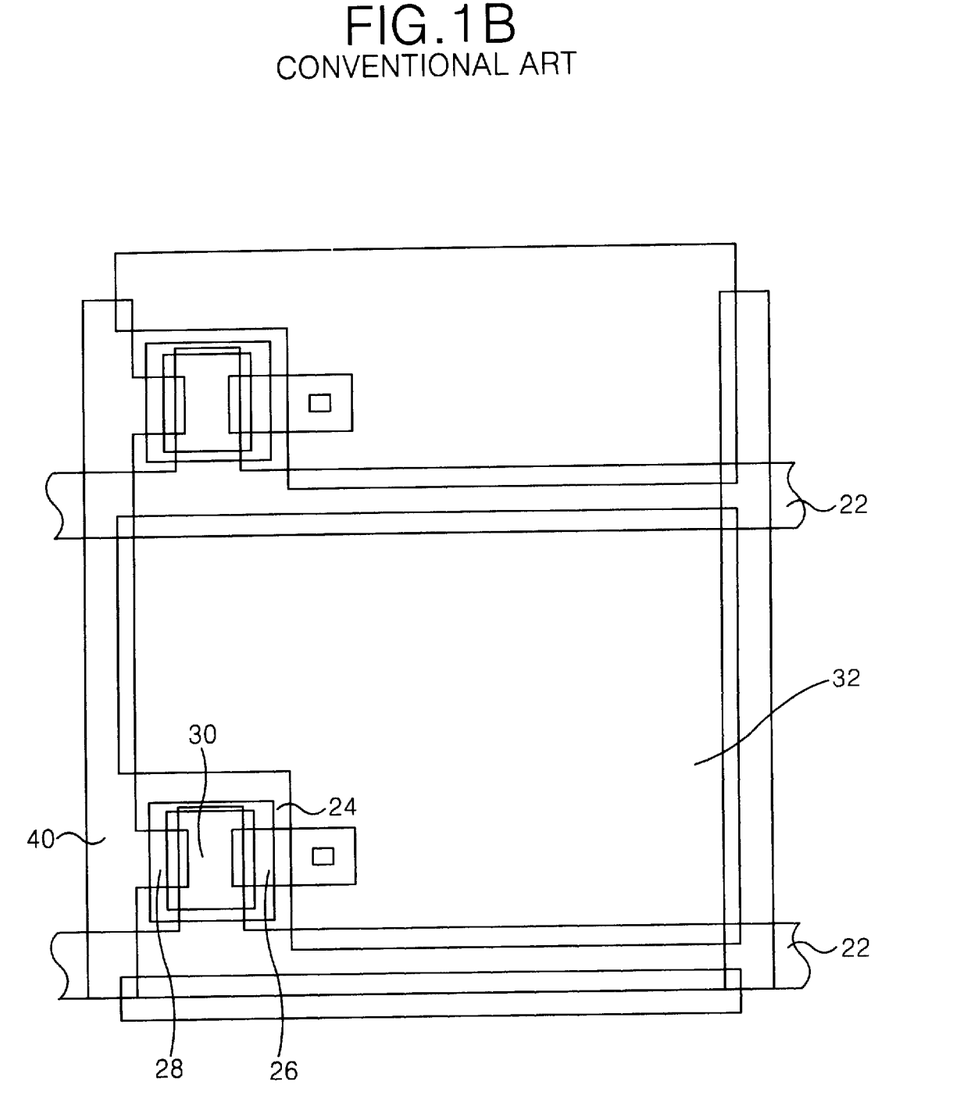

FIG. 1A and FIG. 1B respectively illustrate a sectional schematic view and a planar schematic view of a photosensitive cell in a photosensitive cell array panel. Referring to FIG. 1A, the photo-sensitive cell includes a gate line 22, a thin film transistor (TFT) 24, a charging capacitor (Cst) layer that are formed on a glass substrate 20, and a pixel electrode 32 that is connected to a drain electrode 26 of the TFT and to the charging capacitor Cst. The photo-sensitive cell further includes a gate electrode 30, a source electrode 28, a photo-sensing layer 34 on the pixel electrode 32, an insulating layer 36 on the photo-sensing layer 34, and an upper electrode 38.

The photo-sensing layer 34 is a photoconductive layer that is used for sensing X-rays and for converting those rays to electric charges. The photo-sensing layer 34 is beneficially formed from amorphous selenium having a thickness of hundreds of $\mu$m.

As shown in FIG. 1A and FIG. 1B, the gate electrode 30 electrically connects to the gate line 22. Control signals are applied to the TFT by the gate line and by the gate electrode. The source electrode 28 connects to a data line 40 (see FIG. 1B). Beneficially, the data line 40 is perpendicular to the gate line 22. As previously indicated, the drain electrode 26 of the TFT 24 connects to the pixel electrode 32. As indicated by FIG. 1B, the pixel electrode 32 has an area that is as large as possible. This aids the collection of electric charges from the photo-sensing layer 34. The collected charges are then stored in the charging capacitor Cst. A high voltage generator 42 connects to the upper electrode 38. That voltage generator supplies a voltage that generates an electric field through the photo-sensing layer 34.

As X-rays irradiate an object, the rays that pass through the object are incident on the photo-sensing layer 34. Those incident X-rays produce electron-hole pairs in the photo-sensing layer 34. When a high voltage (several kilovolts) from the high voltage generator 42 is applied to the upper electrode 38, the electron-hole pairs within the photo-sensing layer 34 are separated by the resulting electric field. As shown in FIG. 1A, the holes are collected by the pixel electrode 32 and are stored in the charging capacitor Cst. Alternatively, electrons can be collected and stored. The TFT 24 acts as a switch that controls the discharge of electric charges in the charging capacitor Cst. When a gate voltage is applied to the gate electrode 30 via the gate line 22, a channel is defined between the source electrode 28 and the drain electrode 26. At this time, the electric charge in the charging capacitor Cst is applied to the source electrode 28 via the drain electrode 26. The electric charges applied to the source electrode 28 are then output over the data line 40, which is connected to the source electrode 28.

Figure 2:
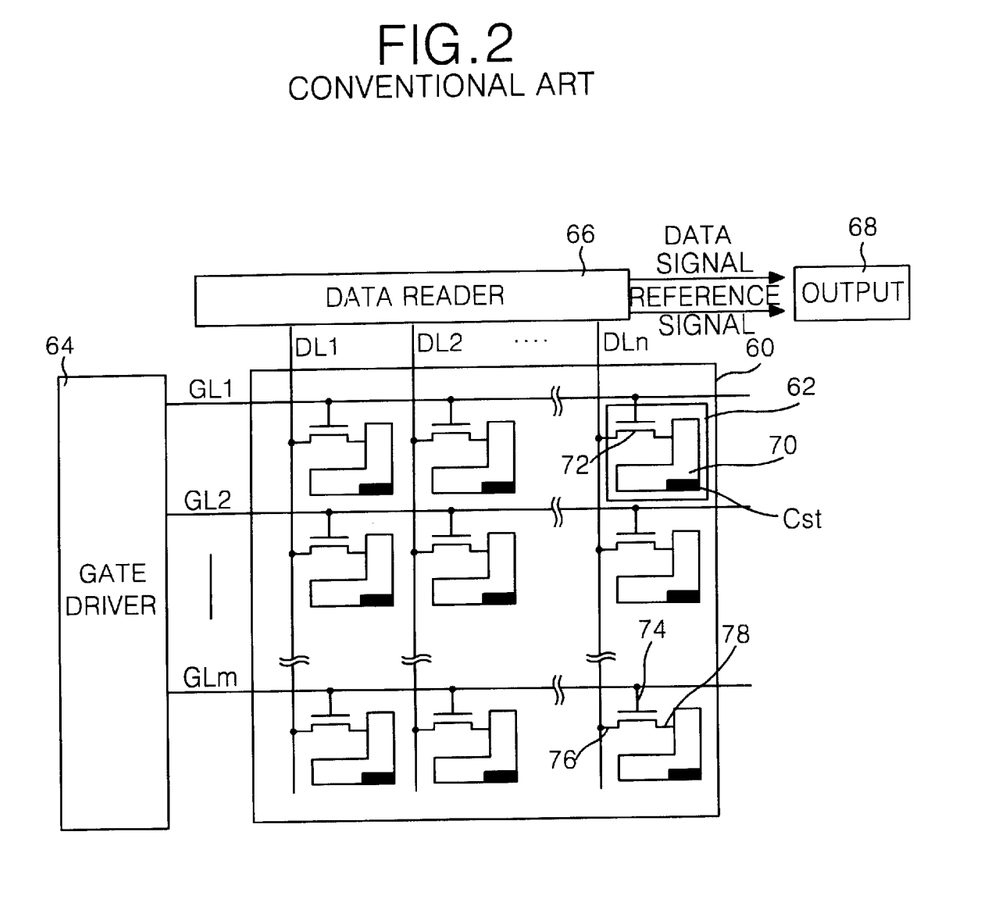
FIG. 2 is a schematic circuit diagram showing a configuration of a conventional X-ray imaging device.

FIG. 2 illustrates an X-ray imaging system having a driving apparatus that converts electric charges stored in a photo sensitive cell array panel into electrical signals that can be output as an image. The X-ray imaging system includes a photo sensitive cell array panel 60 having a plurality of photo-sensing cells 62 that are arranged in a matrix. A gate driver 64 connects to gate lines, that gate lines GL1 to GLm, that are provided on the photo sensitive cell array panel 60. A data reader 66 connects to data lines, the data lines DL1 to DLn, that are also provided on the photo sensitive cell array panel 60. An output 68 displays the electrical signals from the data reader 66 as an image.

In the photo sensitive cell array panel 60 the photo-sensing cells 62 are individually positioned at intersections between the gate lines GL1 to GLm and the data lines DL1 to DLn. In FIG. 2, each of the photo-sensing cells 62 consists of a photo sensor 70, a charging capacitor Cst and a TFT 72. For each photo-sensing cell 62, a gate electrode 74 connects to the gate driver 64 by one of the gate lines GL1 to GLm, and a source electrode 76 connects to the data reader 66 by one of the data lines DL1 to DLn. Furthermore, a drain electrode 78 connects to a charging capacitor Cst.

When a gate control signal from the gate driver 64 is applied, via one of the gate lines GL1 to GLm, to the gate electrode 74 of the TFT 72 of a photo-sensing cell 62, a conductive channel is defined between the drain electrode 78 and the source electrode 76 of the TFT 72. Electric charges stored in the charging capacitor Cst are then transferred to the data reader 66, via one of the data lines DL1 to DLn, by the source electrode 76.

The gate driver 64 sequentially applies pulse-shaped gate control signals to the gate lines GL1 to GLm on the photo sensitive cell array panel 60. When a gate control signal is applied to one of the gate lines, the electric charges stored in the photo-sensing cells 62 connected to that gate line are applied to the data reader 66, thereby forming a scan line. The data reader 66 typically includes n charge amplifiers (not shown) connected to the n data lines DL1 to DLn. The charge amplifiers convert the flow of electric charges (current signals) from the data lines DL1 to DLn into voltage signals. Thus, the data reader 66 generates electrical data signals that correspond to electric charges from the photo sensitive cell array panel 60.

The data reader 66 sequentially applies the n electrical data signals, each of which depends on the intensity of the X-ray energy irradiated onto a photo sensitive cell, and a reference signal to the output 68. The output 68 includes a differential amplifier and an analog-to-digital converter (which are not shown). The electrical data signals input to the output 68 is an analog signal that includes noise. The output 68 differentially amplifies each electrical data signal and the reference signal to remove that noise, and then converts the noise-removed analog signal into a digital signal that is suitable for display on a screen as part of an image.

In an X-ray imaging device that operates as described above, the period of time that the high voltage is applied by the high voltage generator 42 to the upper electrode 38, and the period of time that X-rays are irradiated have a significant impact on the quality of the output image. An instantaneous current is generated at the photo-sensing layer 34 when the high voltage is first applied to the upper electrode 38. This accumulates a dark charge in the charging capacitor Cst. When the high voltage is removed, a variation in the charge stored in the charging capacitor Cst occurs, and thus a signal variation caused by this variation is generated. The image distortion problems caused by the dark charges and signal variations are results of a problem with the method of driving conventional X-ray imaging devices. That problem is described below in conjunction with FIG. 3 and FIG. 4.

Figure 3:
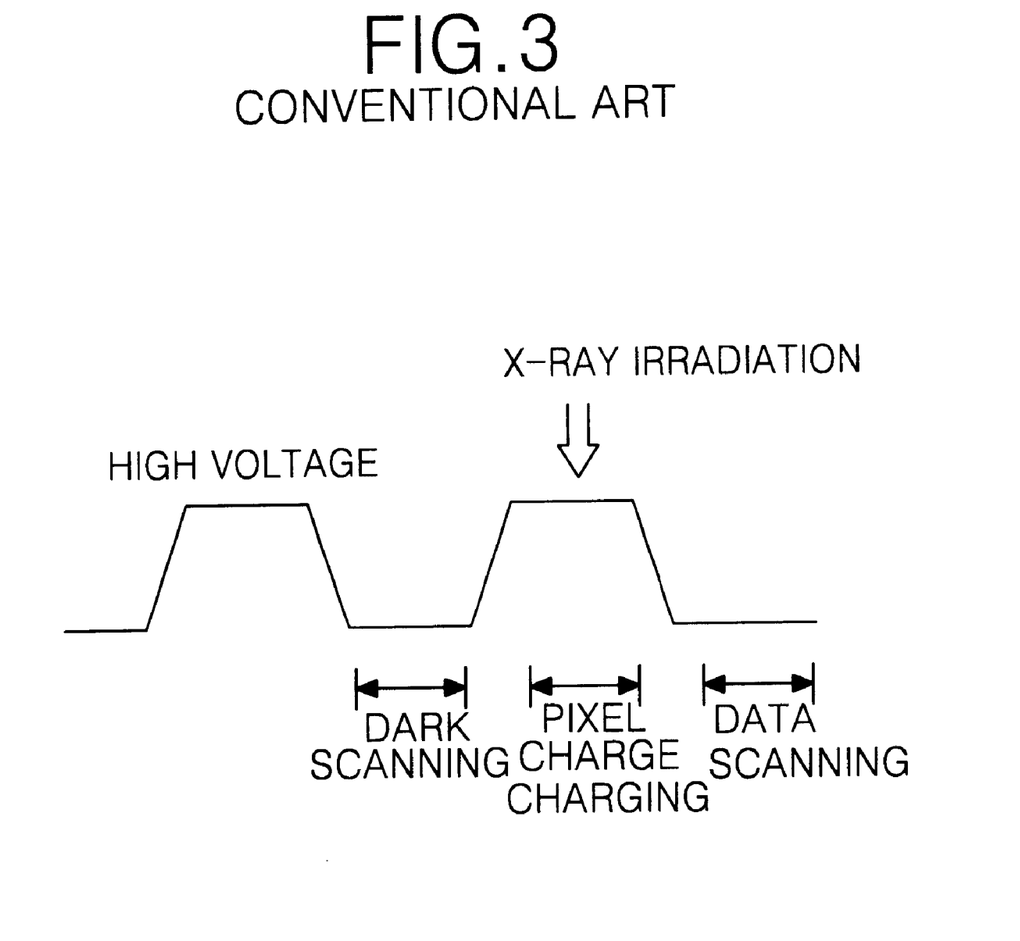
FIG. 3 illustrates a conventional method of driving an X-ray imaging device.

FIG. 3 helps explain a method of driving a conventional X-ray imaging device. FIG. 3 shows a data process from the application of the high voltage until the read-out of the stored electric charges in the charging capacitor Cst. In the conventional driving method, a high voltage is applied by the high voltage generator 42 to the upper electrode 38 prior to irradiating an X-ray image onto the photosensitive cell array panel 60. Pixel charges are then stored in the charging capacitor Cst of each photo-sensing cell 62 as X-rays are irradiated. Then, the high voltage is turned off. Next, the electric charges stored in the charging capacitors Cst are sequentially read as scanning lines by the data reader 66. In such a driving method, charges are produced and stored both by X-ray irradiation and by dark charges that are produced by instantaneous currents created by turning-on the high.

Figure 4:
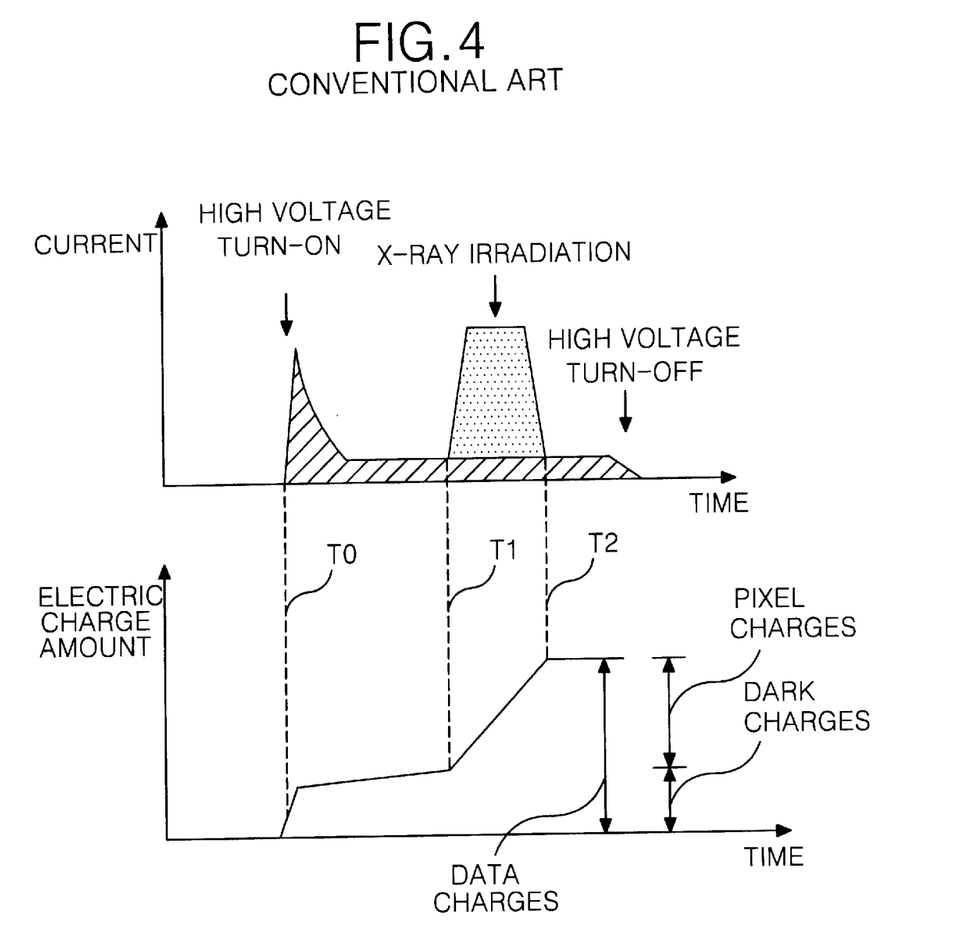
FIG. 4 presents characteristic graphs that represent current variations in the photo-sensing layer and variations in electric charge stored in a charging capacitor Cst when using a conventional method of driving an X-ray imaging device.

FIG. 4 shows characteristic graphs of a time-dependent current variation at the photo-sensing layer and of a time-dependent variation in the electric charge that is stored in the charging capacitor Cst. As shown in FIG. 4, the high voltage applied to the upper electrode 38 prior to X-ray irradiation causes a current flow in the photo-sensing layer 34. This is most pronounced at time T0, which is the time that the high voltage is first applied. This causes a considerable amount of dark charges to be stored in the charging capacitor. When X-ray irradiation is performed, between times T1 and T2, a considerable amount of dark charge has been stored. The pixel charges produced by X-ray irradiation adds to the dark charges. Both charges are included in the total charges that are read from the charging capacitor Cst by the data reader 66 during data scanning, which occurs after the high voltage is turned-off. As a result, distortion problems and image quality deterioration can occur.

To solve such problems, the dark charge included in the total charge must be removed. To accomplish this, the conventional method turns the high voltage applied to the upper electrode 38 on and then off without performing X-ray irradiation. The data reader 66 then determines the amount of dark charge that occurs. The determined amount of dark charge is then subtracted from the total charge obtained after X-ray irradiation. The result is the net pixel charge produced by X-ray irradiation. That amount is then processed by the data reader 66.

In the conventional method described above a considerable amount of dark charge is included in the total charge obtained during data scanning. Since the maximum amount of total electric charge is limited, as the dark charge gets larger the range of treatable maximum pixel charge amount is reduced. Therefore, a picture contrast ratio that is related to the difference between the maximum and minimum pixel charges for each photo-sensing cell is reduced. Furthermore, in the conventional driving method a signal variation phenomenon is produced by the turn-off of the high voltage. The signal variation produces a distortion and an image quality deterioration. In addition, the conventional driving method has a significant drawback in that the turning-on and turning-off work of the high voltage must be performed at least twice. This extends the total data acquisition time required for imaging, something that is unfavorable when speed is important.

SUMMARY OF THE INVENTION

Accordingly, the present invention is directed to a method of driving X-ray imaging devices that substantially obviates one or more of the problems due to limitations and disadvantages of the related art.

An object of the present invention is to provide a method of driving an X-ray imaging device that is capable of improving a contrast ratio of a picture as well as shortening imaging time.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method of driving an X-ray imaging device according to an embodiment that is in accord with the principles of the present invention includes the step of applying a high voltage signal having the same level to the photo-sensing means of each photo-sensing cell during a charging interval of electric charges and during a discharging interval of the charged electric charges.

A method of driving an X-ray imaging device according to another embodiment of the present invention includes the steps of applying a high voltage signal to the photo-sensing means of each photo-sensing cell; storing electric charges in a charging capacitor provided at each photo-sensing cell while maintaining the high voltage signal at a fixed level; and then discharging the charged electric charges using an auxiliary circuit connected to each photo-sensing cell while maintaining the high voltage signal at the fixed level.

A method of driving an X-ray imaging device according to still another embodiment of the present invention includes the steps of applying a high voltage for coupling an electric field to each photo-sensing cell such that electric charges produced at a photo-sensing layer can be stored in a charging capacitor; reading dark charges stored in the charging capacitor of each photo-sensing cell using a data reader at an application time of the high voltage to remove them; irradiating an X-ray onto the photo-sensing layer; and reading pixel charges stored in the charging capacitor of each photo-sensing cell during X-ray irradiation using the data reader.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the illustrated embodiment of the present invention, the example of which is shown in the accompanying drawings.

Figure 5:
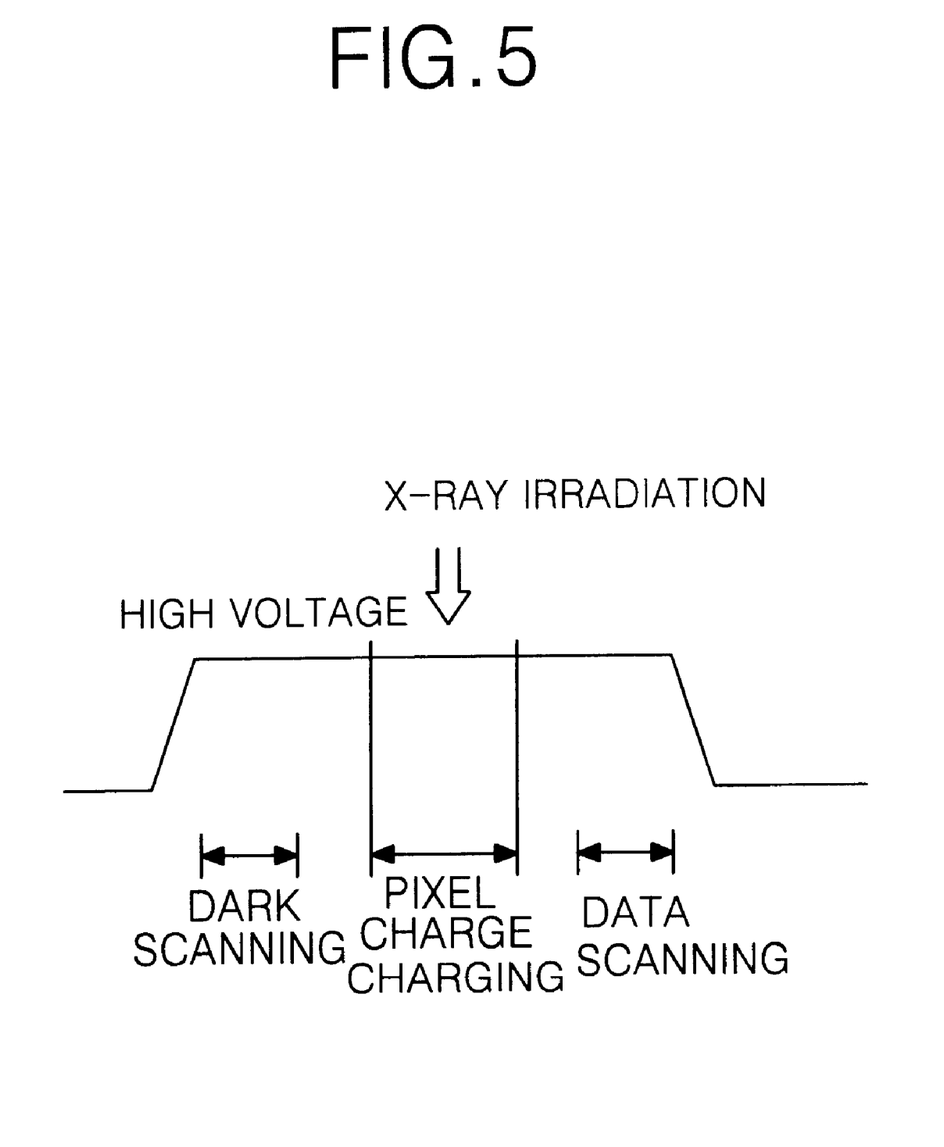
FIG. 5 illustrates a method of driving an X-ray imaging device according to the principles of the present invention.

FIG. 5 helps explain a method of driving an X-ray imaging device according to the principles of the present invention. In particularly, FIG. 5 shows a data gathering process from the application of a high voltage through a data read-out process. Referring to FIG. 5, a high voltage is applied to an upper electrode of each photo-sensing cell, a reading of the dark current is performed just before X-ray irradiation unlike the conventional driving method, thereby removing dark charges charged in a charging capacitor Cst of each photo-sensing cell. After the X-ray irradiation was finished, the data scanning work is carried out prior to turning off the high voltage applied to the upper electrode.

Prior to a detailed explanation of the illustrated embodiment, the structure of each photo-sensing cell in the photo sensitive cell array panel to which the present driving method is applied will be described. The structure of the photo-sensing cell is identical to that shown in FIG. 1A and FIG. 1B. More specifically, the photo-sensing cell includes a gate line 22, a thin film transistor (TFT) 24, and a charging capacitor (Cst) layer that are formed on a glass substrate 20. A pixel electrode 32 connects to a drain electrode 26 of the TFT and to the charging capacitor Cst. A photo-sensing layer 34 is formed on the pixel electrode 32. The photo-sensing layer 34 is for converting X-rays to electric charges. An insulating layer 36 and an upper electrode 38 are formed on the photo-sensing layer 34.

With a high voltage (several kV) from the high voltage generator 42 applied to the upper electrode 38, X-rays incident on the photo-sensing layer 34 produce electron-hole pairs within the photo-sensing layer 34. Those electron-hole pairs are separated by the electric field induced by the applied high voltage. The holes are subsequently stored in the charging capacitor Cst via the pixel electrode 32.

Furthermore, the X-ray imaging system illustrated in FIG. 2 is also suitable for use with the principles of the present invention. The X-ray imaging system illustrated in FIG. 2 converts electric charges stored in each photo-sensing cell of the photo sensitive cell array panel into electrical signals that can be output as an image. When a gate control signal from the gate driver 64 is applied, via one of the gate lines GL1 to GLm, to the gate electrode 74 of a TFT 72, a conductive channel is defined between the source electrode 78 and the drain electrode 76 of that TFT 72. Electric charges stored in the charging capacitor Cst are then transferred to the data reader 66 via one of the data lines DL1 to DLn through the source electrode 76. The gate driver 64 sequentially applies a pulse-shaped gate control signal to each of the m gate lines GL1 to GLm. This causes the electric charges stored in the photosensing cells 62 connected to the gate line that receives the gate control signal to be applied as a scan line to the data reader 66. The data reader 66 typically includes n charge amplifiers (not shown) connected to the n data lines DL1 to DLn. Such charge amplifiers converts received electric charges, that is current signals from the data lines DL1 to DLn, into electrical data signals. Thus, the data reader 66 generates electrical data signals that correspond to the electric charges from the photo sensitive cell array panel 60, which in turn correspond to the X-ray irradiated onto the photo sensitive cell array. The data reader 66 sequentially applies the n electrical data signals and a reference signal to the output 68. The output 68 includes a differential amplifier and an analog-to-digital converter (not shown). The electrical data signals input to the output 68 are analog signals that include noise. The output 68 differentially amplifies the electrical data signals and the reference signal to remove the noise, and converts the noise-removed analog signal into a digital signal that is suitable display on a screen as part of an image.

Hereinafter, a method of driving the X-ray imaging so as to reduce picture distortion and contrast deterioration will be described in detail. As shown in FIG. 5, a high voltage for an electric field formation is applied to the upper electrode 38 (see FIG. 1A). At the turn-on of the high voltage an instantaneous current as shown at time T0 in FIG. 6 flows in the photo-sensing layer 34 (see FIG. 1A). A considerable amount of dark charge caused by the instantaneous current that results when the high voltage is applied is stored in the charging capacitor Cst. Since such dark charge can bring about a deterioration of contrast ratio, the driving method according to the principles of the present invention removes the dark charge stored in each photo-sensing cell 62 by performing special dark scanning work using the data reader 66 prior to X-ray irradiation. The conventional driving method turns off the high voltage and then performs dark scanning work to obtain the dark charge caused by the high voltage.

Figure 6:
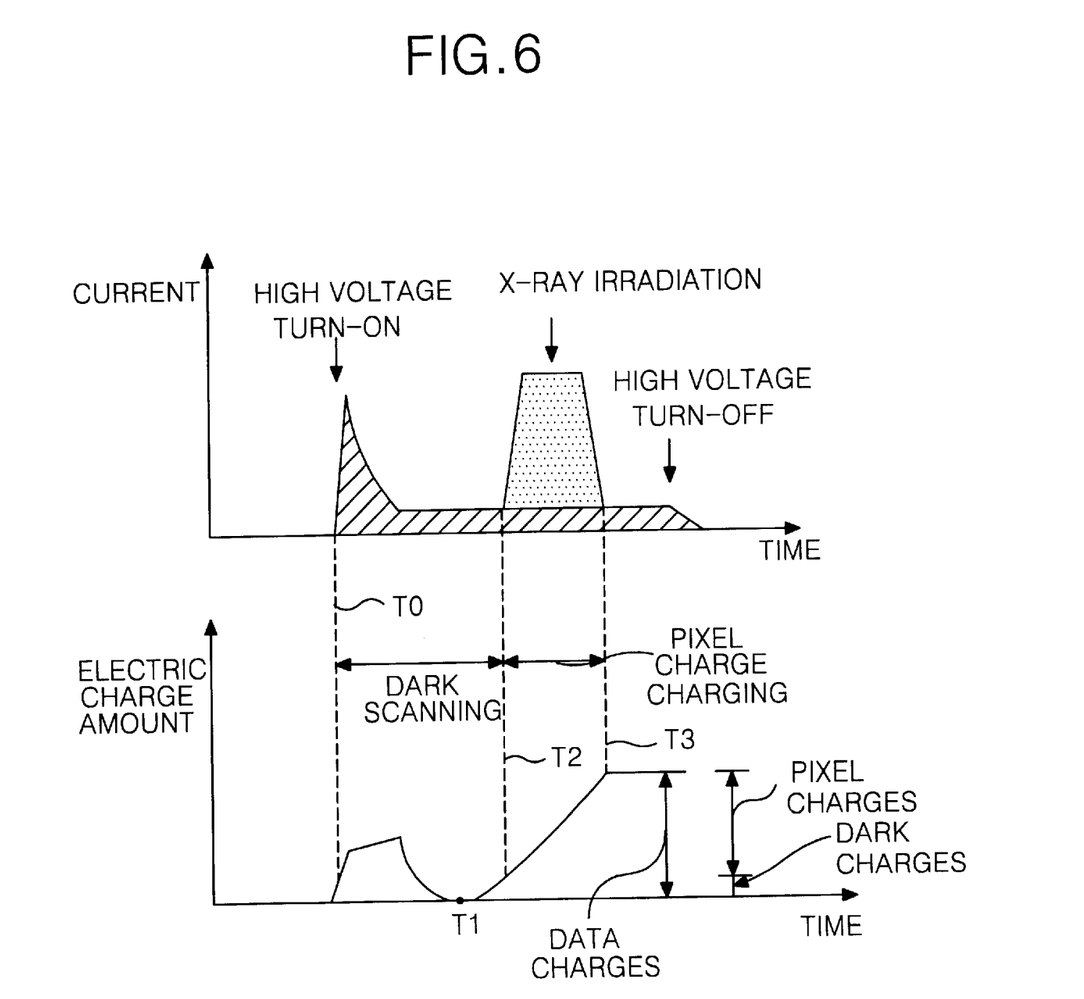
FIG. 6 presents characteristic graphs that represent current variations in the photo-sensing layer and variations in electric charge stored in a charging capacitor Cst when using a method of driving an X-ray imaging device that is in accord with the principles of the present invention.

However, the present driving method performs dark scanning work without turning the high voltage off (by maintaining the high voltage at its normal magnitude). During dark scanning, the data reader 66 obtains the dark charge stored in each charging capacitor Cst of each photo-sensing cell 62 by a sequential scan of each scan line of the panel. By virtue of such dark scanning work, the dark charge stored in each photo-sensing cell 62 is almost entirely removed. That is, after sending the dark charges to the data reader there is almost no dark charge remaining in the charging capacitor Cst of each photo-sensing cell 62, see time T1 of FIG. 6. Significantly, the high voltage remains on during this process. Then, as shown in FIG. 6, between times T2 and T3 X-ray irradiation is performed. The pixel charges produced within the photo-sensing layer 34 by the X-ray irradiation are stored in the charging capacitor Cst of each photo-sensing cell 62.

After termination of the X-ray irradiation, data scanning work by the data reader 66 is carried out while maintaining the high voltage. With conventional methods the high voltage was removed. The pixel charges produced by X-ray irradiation occupy a major portion of the total charges received by the data reader 66 from the charging capacitors Cst. Since the dark charge stored after the application of the high voltage are removed prior to X-ray irradiation by virtue of the dark scanning work, the amount of dark charge included in the total charge during data scanning is very small as shown in FIG. 6. By this method, a deterioration of a picture contrast ratio caused by dark charges can be effectively prevented. It is particularly beneficial if the present driving method is applied to situations where the maximum total charge applied to the data reader 66 during data scanning is limited. In that case, by reducing the dark charge included in the total charge can significantly enlarge the range of pixel charges. Accordingly, the picture contrast ratio related to the difference in the maximum and minimum pixel charges from each photo-sensing cell 62 can be improved. After completion of the data scanning work, the high voltage applied to the upper electrode 38 is turned off. By maintaining the high voltage after X-ray irradiation one can prevent the signal variation that occurs in the conventional method when the high voltage is turned-off.

In the illustrated driving method the high-voltage is turned-on and turned-off only once. Once the high voltage has been turned-on, the dark scanning, the X-ray irradiation, and the data scanning work are sequentially carried out. The high voltage applied to the upper electrode 38 is not turned off until the data scanning work is complete. This reduces the total driving time in comparison to the conventional driving method in which the high voltage is turned-on and off at least twice. As a result, the present driving method is favorable to high-speed data treatments and to high-resolution displays.

According to the illustrated embodiment dark scanning, X-ray irradiation, and data scanning work are sequentially carried out after applying a high voltage to the photo-sensing cells. The dark charge stored in each photo-sensing cell after the application of the high voltage is removed by dark scanning work performed before X-ray irradiation. Using this method a contrast ratio deterioration caused by dark charges can be reduced or prevented. Furthermore, as the high voltage is turned off only after termination of the data scanning work, a signal variation phenomenon cause by said turn-off the high voltage also can be prevented.

It will be apparent to those skilled in the art that various modifications and variation can be made in the present invention without departing from the spirit or scope of the invention. Thus, it is intended that the present invention covers the modifications and variations of this invention provided they come within the scope of the appended claims and their equivalents.

What is claimed is:

1. A method of operating an X-ray imaging device having a data reader and a plurality of photo-sensing cells, wherein each cell includes a charging capacitor for storing charge, a transistor switch for selectively applying the stored charges to the data reader, a photo-sensitive layer for converting irradiated X-rays into electron-hole pairs, and a pixel electrode for separating the electron-hole pairs into electric charges that are applied to the charging capacitor, the method comprising:

applying a high voltage to the photosensitive layer before X-ray irradiation;

storing charges that results when the high voltage is applied without X-ray irradiation as dark charge in the charging capacitor; and applying the dark charge to the data reader while maintaining the high voltage applied to the photosensitive layer, wherein the data reader significantly discharges the stored charge.

2. The method according to claim 1, further including applying X-ray irradiation to the X-ray imaging device after the dark charge is applied to the data reader, wherein electron-hole pairs produced in the photo-sensitive layer are converted into X-ray intensity dependent electric charges that are stored in the charging capacitor, wherein the high voltage remains on.

3. The method according to claim 2, further including applying X-ray intensity dependent electric charges stored in the charging capacitor to the data reader.

4. The method according to claim 3, wherein the X-ray intensity dependent electric charges stored in the charging capacitor are applied to the data reader while maintaining the high voltage applied to the photo-sensitive layer.

5. A method of driving an X-ray imaging device, wherein a driving time of a photo-sensing cell having a photo-sensing layer that responds to irradiated X-rays by producing electric charges, includes a dark time interval, wherein X-rays are not irradiated onto the X-ray imaging device, and a subsequent irradiation interval, wherein X-rays are irradiated onto the X-ray imaging device, said method comprises continuously applying a high voltage signal to said photo-sensing layer during the driving time.

6. The method according to claim 5, wherein during said dark time interval dark charges generated by the high voltage signal are charged.

7. The method according to claim 6, wherein, during said dark time interval the dark charges are discharged.

8. The method according to claim 7, wherein, during the irradiation interval pixel charges produced by the X-rays are stored in the photo-sensing cell.

9. The method according to claim 8, wherein the driving time further includes a data reading interval after the irradiation interval, wherein charges stored during the irradiation interval are converted to electric data signals.

10. A method of driving an X-ray imaging device wherein a driving time of a photo sensitive cell array panel having a plurality of photo-sensing cells, each of which includes a photo-sensing layer for responding to an irradiated X-ray by producing electric charges, including:

applying a high voltage to the photo-sensing layer of each cell;

storing electric charges in each photo-sensing cell while maintaining the application of the high voltage; and discharging the stored electric charges using an electric circuit connected to each photo-sensing cell while maintaining the application of the high voltage signal.

11. The method according to claim 10, wherein the discharging of the stored electric charges includes:

discharging dark charges stored after the application of the high voltage; and subsequently discharging pixel charges stored during X-ray irradiation.

12. The method according to claim 11, further including turning off the high voltage signal after discharging the pixel charges.

13. A method of driving an X-ray imaging device having a data reader and a photo sensitive cell array panel having a plurality of photo sensing cells, each of which includes a photo-sensing layer for producing electric charges by X-ray irradiation and a charging capacitor for storing charges produced at the photo-sensing layer, wherein the data reader is for reading the electric charges stored in each photo-sensing cell and for converting them into data signals, the method including:

applying a high voltage that creates an electric field in each photo-sensing cell such that electric charges can be stored in the charging capacitor;

reading the dark charges stored in the charging capacitor of each photo-sensing cell with the data reader so as to remove the stored dark charges;

irradiating X-rays onto the photo-sensing layer; and reading the pixel charges charged in the charging capacitor of each photo-sensing cell with the data reader after the X-ray irradiation.

14. The method according to claim 13, further including turning off the high voltage applied to each photo-sensing cell after completing the read-out of the pixel charges.

* * * * *